US010093196B2

(12) United States Patent
Unno et al.

(10) Patent No.: US 10,093,196 B2
(45) Date of Patent: Oct. 9, 2018

(54) ELECTRIC STORAGE DEVICE, EQUIPMENT, AND CONTROL METHOD

(71) Applicant: HONDA MOTOR CO., LTD., Tokyo (JP)

(72) Inventors: Ryota Unno, Wako (JP); Daijiro Takizawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 28 days.

(21) Appl. No.: 15/458,974

(22) Filed: Mar. 15, 2017

(65) Prior Publication Data

US 2017/0267115 A1    Sep. 21, 2017

(30) Foreign Application Priority Data

Mar. 15, 2016   (JP) .................................. 2016-050992

(51) Int. Cl.
| H02J 7/00 | (2006.01) |
| B60L 11/18 | (2006.01) |
| B60L 7/10 | (2006.01) |
| H02J 7/34 | (2006.01) |

(52) U.S. Cl.
CPC ............. *B60L 11/1842* (2013.01); *B60L 7/10* (2013.01); *H02J 7/007* (2013.01); *H02J 7/0013* (2013.01); *H02J 7/345* (2013.01)

(58) Field of Classification Search
CPC .................................................. B60L 11/1842
USPC .................................................. 320/166, 167
See application file for complete search history.

(56) References Cited

U.S. PATENT DOCUMENTS

2015/0137752 A1    5/2015  Shinzaki et al.

*Primary Examiner* — Edward Tso
*Assistant Examiner* — Ahmed Omar
(74) *Attorney, Agent, or Firm* — Mori & Ward, LLP

(57) ABSTRACT

An electric storage device includes a first electric capacitor, a second electric capacitor, a converter, and a processor. The converter converts electric power transmitted between an external power system external to the electric storage device and at least one of the first electric capacitor and second electric capacitor. The processor is configured to control the converter to operate in at least one of a first mode and a second mode, the first electric capacitor continuously discharging electric power to the external power system in the first mode, the second electric capacitor discharging electric power to the external power system and being charged by the external power system, intermittently, to stabilize frequencies in the external power system in the second mode.

17 Claims, 13 Drawing Sheets

FIG. 3

| <<CHARACTERISTICS DIFFERENCE>> | HIGH-CAPACITY BATTERY ES-E | HIGH-OUTPUT BATTERY ES-P |
|---|---|---|
| ENERGY WEIGHT DENSITY (W/kg) | LARGE | SMALL |
| OUTPUT WEIGHT DENSITY (Wh/kg) | SMALL | LARGE |
| INTERNAL RESISTANCE (IMPEDANCE) | LARGE | SMALL |
| C-RATE CHARACTERISTICS | LARGE | SMALL |
| COST | LARGE | SMALL |
| <<PREFERABLE CHARGING/DISCHARGING MODE>> | CONTINUOUSLY CHARGING/DISCHARGING CONSTANT ELECTRIC POWER AT LOW OR MEDIUM LEVEL | INSTANTANEOUSLY CHARGING/DISCHARGING ELECTRIC POWER AT MEDIUM OR LARGE LEVEL |

ELECTRIC STORAGE DEVICE, EQUIPMENT, AND CONTROL METHOD

CROSS-REFERENCE TO RELATED APPLICATIONS

The present application claims priority under 35 U. S. C. § 119 to Japanese Patent Application No. 2016-050992, filed Mar. 15, 2016. The contents of this application are incorporated herein by reference in their entirety.

BACKGROUND OF THE INVENTION

Field of the Invention

The present invention relates to an electric storage device, equipment, and a control method.

Discussion of the Background

U.S. Patent Application Publication No. 2015-0137752 Specification describes charging and discharging performed by an electric vehicle in the vehicle to grid (V2G). The V2G is a system for interchanging electric power between a power system including a commercial power grid and an electric vehicle. When the electric vehicle is not in use as transportation means, an electric condenser installed in this electric vehicle is used as one of power storage facilities in the commercial power grid. Thus, the electric vehicle joining the V2G and the power system interchange electric power bidirectionally. The electric vehicle joining the V2G performs any one of: continuous discharging for maintaining supply-demand balance in the power system; and charging and discharging for stabilizing frequencies in the power system. Electric power acquired by the continuous discharging of the electric vehicle for maintaining supply-demand balance is used as "spinning reserve" of the power system. Meanwhile, electric power interchanged by the charging and discharging of the electric vehicle for stabilizing frequencies is used for "frequency regulation" of the power system. In both cases, the electric vehicle helps to stabilize the power system.

SUMMARY OF THE INVENTION

According to a first aspect of the present invention, an electric storage device includes a first electric capacitor, a second electric capacitor, a converter, and a processor. The first electric capacitor has first output weight density and first energy weight density. The second electric capacitor has second output weight density larger than the first output weight density and second energy weight density smaller than the first energy weight density. The converter converts electric power transmitted between an external power system external to the electric storage device and at least one of the first electric capacitor and second electric capacitor. The processor is configured to control the converter to operate in at least one of a first mode and a second mode, the first electric capacitor continuously discharging electric power to the external power system in the first mode, the second electric capacitor discharging electric power to the external power system and being charged by the external power system, intermittently, to stabilize frequencies in the external power system in the second mode.

According to a second aspect of the present invention, an electric storage device includes a first electric capacitor, a second electric capacitor, a converter, and a processor. The first electric capacitor has first output weight density and first energy weight density. The second electric capacitor has second output weight density larger than the first output weight density and second energy weight density smaller than the first energy weight density. The converter converts electric power transmitted between an external power system external to the electric storage device and at least one of the first electric capacitor and second electric capacitor. The processor is configured to control the converter to operate in at least one of a first mode and a second mode, the first electric capacitor continuously discharging electric power to the external power system in the first mode in a way of being suitable for characteristics of the first electric capacitor, the second electric capacitor discharging electric power to the external power system and being charged by the external power system, intermittently, in a way of being suitable for characteristics of the second electric capacitor.

According to a third aspect of the present invention, a control method for an electric storage device including a first electric capacitor, a second electric capacitor, and a converter to convert electric power transmitted between an external power system external to the electric storage device and at least one of the first electric capacitor and second electric capacitor, the control method includes controlling the converter to operate in at least one of a first mode and a second mode, the first electric capacitor continuously discharging electric power to the external power system in the first mode, the second electric capacitor discharging electric power to the external power system and being charged by the external power system, intermittently, to stabilize frequencies in the external power system in the second mode.

According to a fourth aspect of the present invention, a control method for an electric storage device including a first electric capacitor, a second electric capacitor, and a converter to convert electric power transmitted between an external power system external to the electric storage device and at least one of the first electric capacitor and second electric capacitor, the control method includes controlling the converter to operate in at least one of a first mode and a second mode, the first electric capacitor continuously discharging electric power to the external power system in the first mode in a way of being suitable for characteristics of the first electric capacitor, the second electric capacitor discharging electric power to the external power system and being charged by the external power system, intermittently, in a way of being suitable for characteristics of the second electric capacitor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 3 is a chart illustrating, in table form, differences in characteristics and the like between a high-capacity battery and a high-output battery.

DESCRIPTION OF THE EMBODIMENTS

Figure 1:
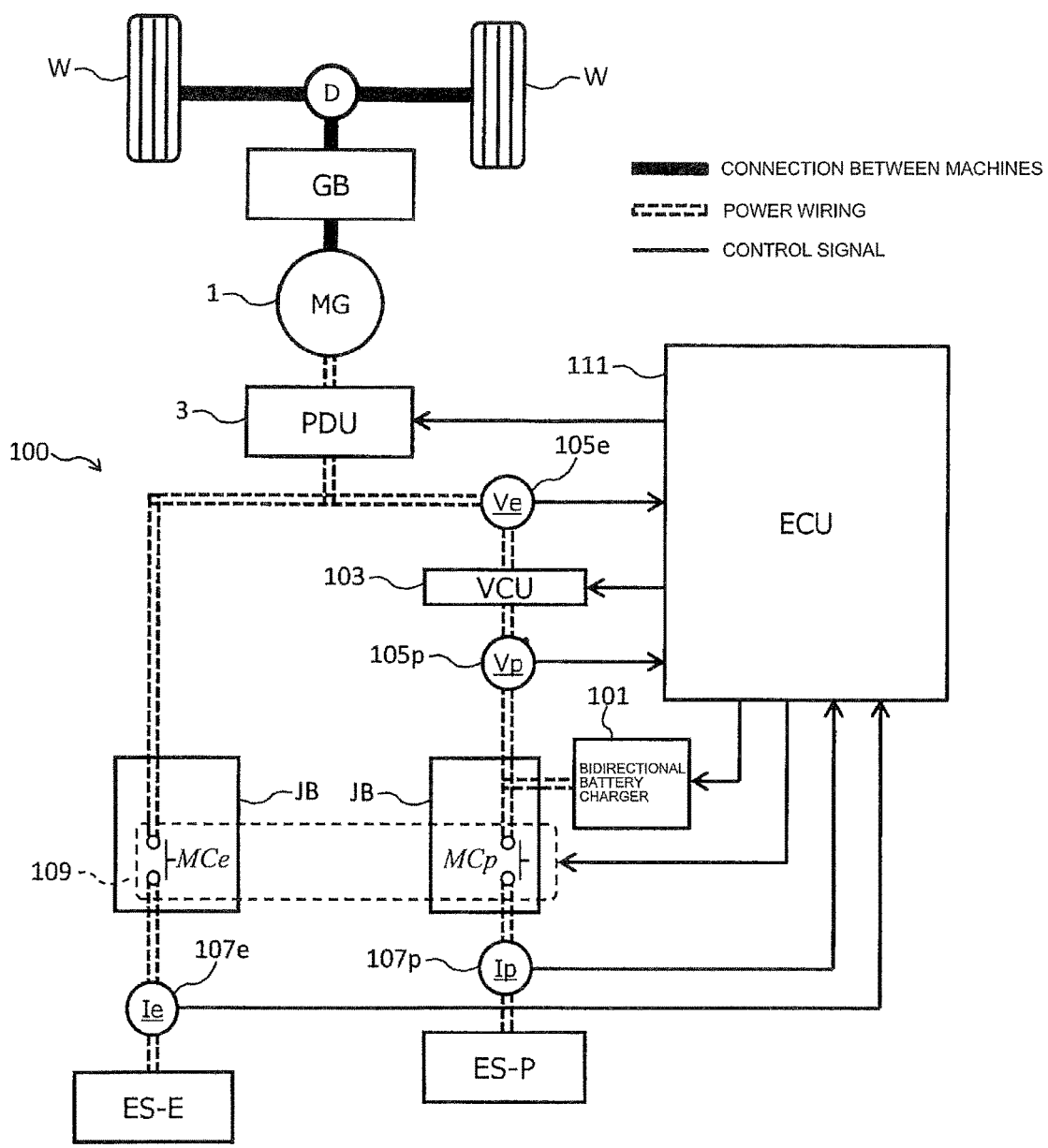
FIG. 1 is a block diagram illustrating a schematic configuration of the drive line of an electric vehicle equipped with an electric storage device according to an embodiment of the present invention.

The embodiments will now be described with reference to the accompanying drawings, wherein like reference numerals designate corresponding or identical elements throughout the various drawings.

Hereinbelow, embodiments of the present invention are described with reference to the drawings.

FIG. 1 is a block diagram illustrating a schematic configuration of the drive line of an electric vehicle equipped with an electric storage device according to an embodiment of the present invention. Thick lines in FIG. 1 represent connection between machines, double dashed lines represent power wiring, and arrows in thin solid lines represent control signals. The single-motor electric vehicle illustrated in FIG. 1 includes: a motor generator (MG) 1; a power drive unit (PDU) 3; and an electric storage device 100 of the embodiment. Hereinbelow, constituents of the electric vehicle are described.

The motor generator 1 is driven by electric power supplied from the electric storage device 100, to generate power for the electric vehicle to travel. Torque generated by the motor generator 1 is transmitted to driving wheels W via a gear box GB including variable-speed gears or a fixed gear and a differential gear D. In addition, when the electric vehicle is decelerating, the motor generator 1 works as a generator to output the braking force of the electric vehicle. Regenerative power generated by causing the motor generator 1 to work as the generator is stored in batteries in the electric storage device 100.

The PDU 3 is configured to convert a direct-current (DC) voltage into an alternating-current (AC) voltage and supply a three-phase current to the motor generator 1. The PDU 3 is also configured to convert an AC voltage, which is input when the motor generator 1 performs a regeneration operation, into a DC voltage.

As illustrated in FIG. 1, the electric storage device 100 includes: a high-capacity battery ES-E and a high-output battery ES-P that are electric condensers capable of charging and discharging; a bidirectional battery charger 101; a voltage control unit (VCU) 103; voltage sensors 105*e* and 105*p*; current sensors 107*e* and 107*p*; a switch unit 109; and an electronic control unit (ECU) 111.

The high-capacity battery ES-E has multiple storage cells such as lithium-ion battery cells and nickel-metal hydride battery cells, and is configured to supply high-voltage electric power to the motor generator 1. The high-output battery ES-P also has multiple storage cells such as lithium-ion battery cells and nickel-metal hydride battery cells, and is configured to supply high-voltage electric power to the motor generator 1 via the VCU 103. The high-output battery ES-P is connected to the PDU 3 via the VCU 103 in parallel with the high-capacity battery ES-E. In addition, the voltage of the high-output battery ES-P is typically lower than the voltage of the high-capacity battery ES-E. For this reason, the electric power of the high-output battery ES-P is stepped up to the same level as the voltage of the high-capacity battery ES-E by the VCU 103, and is then supplied to the motor generator 1 via the PDU 3.

Note that the high-capacity battery ES-E and the high-output battery ES-P are not limited to the aforementioned secondary cells such as nickel-metal hydride battery cells and lithium-ion battery cells. For example, condensers and capacitors that have a small available electric storage capacity but are capable of charging and discharging a large amount of electric power in a short period of time may be used as the high-output battery ES-P.

In addition, the characteristics of the high-capacity battery ES-E and the characteristics of the high-output battery ES-P differ from each other. The output weight density of the high-capacity battery ES-E is lower than that of the high-output battery ES-P, but the energy weight density thereof is higher than that of the high-output battery. In contrast, the energy weight density of the high-output battery ES-P is lower than that of the high-capacity battery ES-E, but the output weight density thereof is higher than that of the high-capacity battery. In this way, the high-capacity battery ES-E is superior to the other in terms of energy weight density, while the high-output battery ES-P is superior to the other in terms of output weight density. Here, the energy weight density indicates the amount of electric power per unit weight (Wh/kg), and the output weight density indicates electric power per unit weight (W/kg). This means that the high-capacity battery ES-E superior in energy weight density is an electric condenser employed mainly for its high capacity, and the high-output battery ES-P superior in output weight density is an electric condenser employed mainly for its high output.

Such differences between the characteristics of the high-capacity battery ES-E and the characteristics of the high-output battery ES-P are caused due to various parameters that are set depending on the structures, materials, and the like of the constituents of the battery cells such as electrodes, active materials, and electrolytes/electrolytic solutions. For example, the high-capacity battery ES-E is superior to the high-output battery ES-P in terms of the available electric storage capacity that is a parameter indicating a total amount of electricity capable of charging and discharging; on the other hand, the high-output battery ES-P is superior to the high-capacity battery ES-E in terms of the C-rate characteristics that is a parameter indicating the resistance to deterioration of the available electric storage capacity during charging and discharging and the internal resistance (impedance) that is a parameter indicating an electric resistance value during charging and discharging.

Figure 2:
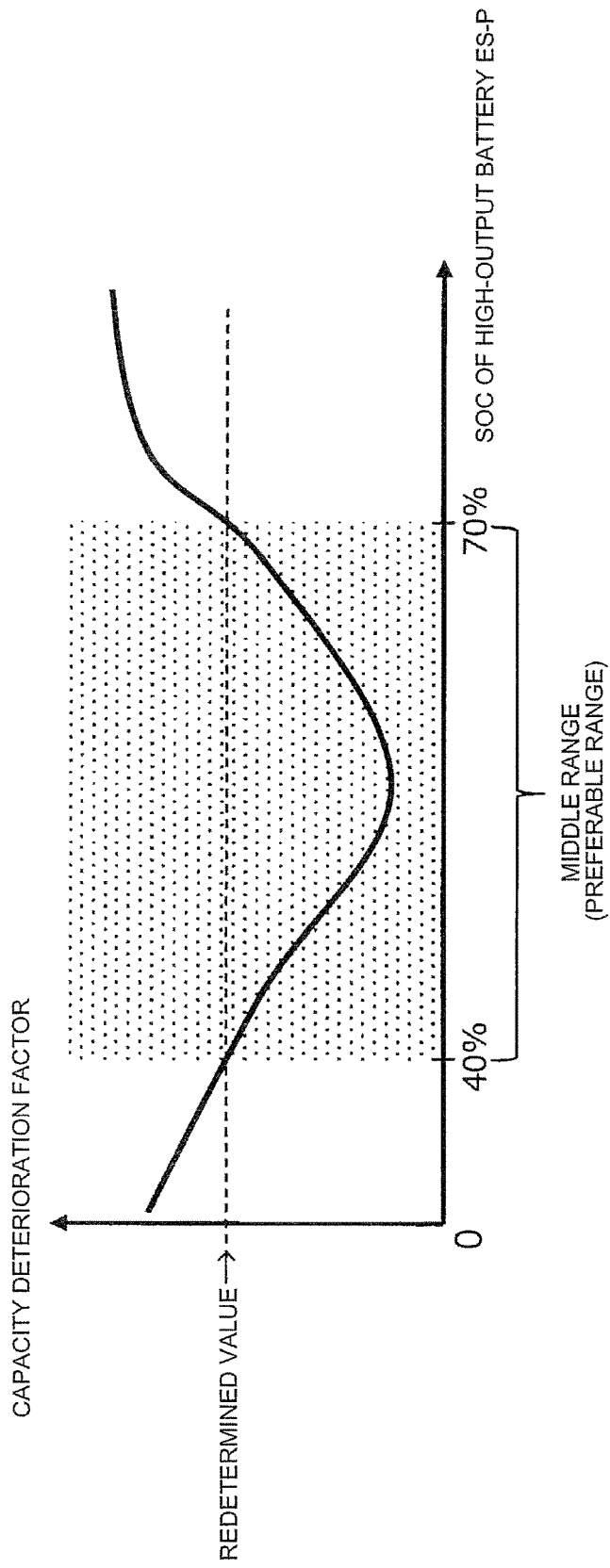
FIG. 2 is a chart illustrating the capacity deterioration coefficient of a high-output battery relative to its SOC.

Further, there is a small variation in the capacity deterioration coefficient of the high-capacity battery ES-E relative to its charging rate (state of charge (SOC)), and thus it does not deteriorate largely at a fully charged voltage and a discharging end voltage. In contrast, as illustrated in FIG. 2, there is a large variation in the capacity deterioration coefficient of the high-output battery ES-P relative to its SOC, and its capacity deterioration coefficient in an SOC middle range is small but its capacity deterioration coefficient in SOC ranges other than the middle range is large. For this reason, the SOC middle range in which the capacity deterioration coefficient is equal to or smaller than a predetermined value is set as a preferable range for the high-output battery ES-P. Here, between an SOC low range and high range of the high-output battery ES-P in which the SOC is lower and higher than that in the middle range, the high range is higher than the low range in terms of the increasing rate of the capacity deterioration coefficient observed when the SOC shifts away from the middle range.

In this manner, the characteristics of the high-capacity battery ES-E and the characteristics of the high-output battery ES-P are different. FIG. 3 is a chart illustrating, in table form, differences in characteristics and the like between the high-capacity battery ES-E and the high-output battery ES-P. As illustrated in FIG. 3, the high-capacity battery ES-E and the high-output battery ES-P are different in energy weight density, output weight density, internal resistance (impedance), C-rate characteristics, cost, and preferable charging/discharging mode.

The bidirectional battery charger 101 is connected in parallel to the high-output battery ES-P and the VCU 103 via a junction box JB placed between the high-output battery ES-P and the VCU 103. The bidirectional battery charger 101 is configured to convert an AC voltage, acquired from an external power system such as a commercial power supply, into a DC voltage. The electric power having been converted into the DC voltage by the bidirectional battery charger 101 is charged into the high-output battery ES-P, or into the high-capacity battery ES-E via the VCU 103. The bidirectional battery charger 101 is also configured to convert a DC voltage, discharged from the high-output battery ES-P or the high-capacity battery ES-E, into an AC voltage. The electric power having been converted into the AC voltage by the bidirectional battery charger 101 is sent to the external power system. Note that, although the bidirectional battery charger 101 is placed between the VCU 103 and the high-output battery ES-P in the example illustrated in FIG. 1, it may be placed between the VCU 103 and the high-capacity battery ES-E.

The VCU 103 is configured to step up a DC voltage output from the high-output battery ES-P or a DC voltage output from the bidirectional battery charger 101 without conversion to AC. The VCU 103 is also configured to step down the voltage of electric power that is generated by the motor generator 1 when the electric vehicle is decelerating and converted into DC. The VCU 103 is further configured to step down a DC voltage output from the high-capacity battery ES-E without conversion to AC. The electric power whose voltage has been stepped down by the VCU 103 is charged into the high-output battery ES-P, or is sent to the external power system via the bidirectional battery charger 101. Here, the voltage level or current level of DC power output from the VCU 103 is controlled by the ECU 111.

The voltage sensor 105p is configured to detect a voltage Vp of the high-output battery ES-P. A signal indicating the voltage Vp detected by the voltage sensor 105p is sent to the ECU 111. The voltage sensor 105e is configured to detect a voltage Ve of the high-capacity battery ES-E. Here, the voltage Ve detected by the voltage sensor 105e is equal to a value obtained such that the voltage Vp of the high-output battery ES-P is stepped up by the VCU 103. A signal indicating the voltage Ve detected by the voltage sensor 105e is sent to the ECU 111.

The current sensor 107p is configured to detect an input/output current Ip of the high-output battery ES-P. A signal indicating the input/output current Ip detected by the current sensor 107p is sent to the ECU 111. The current sensor 107e is configured to detect an input/output current Ie of the high-capacity battery ES-E. A signal indicating the input/output current Ie detected by the current sensor 107e is sent to the ECU 111.

The switch unit 109 has, in a junction box JB: an electromagnetic contactor MCe that is configured to connect/disconnect a current path from the high-capacity battery ES-E to the PDU 3 or the VCU 103; and an electromagnetic contactor MCp that is configured to connect/disconnect a current path from the high-output battery ES-P to the VCU 103 or the bidirectional battery charger 101. These electromagnetic contactors MCe and MCp are opened and closed under control of the ECU 111.

The ECU 111 is configured to control the PDU 3, the VCU 103, and the bidirectional battery charger 101, and perform open/close control on the switch unit 109. The ECU 111 is also configured to derive the SOCs of the high-capacity battery ES-E and the high-output battery ES-P based on the voltages detected by the voltage sensors 105p and 105e and the input/output currents detected by the current sensors 107p and 107e by use of the current integration method and/or the open circuit voltage (OCV) estimation method.

Further, the ECU 111 is configured to perform power distribution control using the VCU 103 so as to take advantage of the high-capacity battery ES-E and the high-output battery ES-P having different characteristics as illustrated in FIG. 3. Under the power distribution control of the ECU 111, the high-capacity battery ES-E is used for supplying constant electric power to the motor generator 1 when the electric vehicle is traveling, and the high-output battery ES-P is used for supplying electric power to the motor generator 1 when large driving force is needed for the electric vehicle to travel. In addition, regenerative power generated by the motor generator 1 is preferentially input into the high-output battery ES-P. Accordingly, the SOC of the high-capacity battery ES-E in the substantially entire range from 0% to 100% is set as its usable range, and it decreases continuously during travel. On the other hand, the SOC of the high-output battery ES-P in the middle range from 40% to 70% illustrated in FIG. 2, for example, is set as its usable range, and it shifts in or near the middle range so as to be kept within predetermined middle values in this range.

Furthermore, the ECU 111 is configured to perform charging/discharging control between the electric vehicle equipped with the electric storage device 100 of this embodiment and the external power system by use of the bidirectional battery charger 101 when the electric vehicle joins the vehicle to grid (V2G) described below. Before description of the charging/discharging control, the V2G that the electric vehicle can join is described below.

The V2G is a system for interchanging electric power between a power system including a commercial power grid and an electric vehicle. When the electric vehicle is not in use as transportation means, an electric condenser installed in this electric vehicle is used as a power storage facility. Thus, the electric vehicle joining the V2G and the power system interchange electric power bidirectionally. According to the condition of the power system, the electric vehicle joining the V2G performs any one of: continuous discharging for maintaining supply-demand balance in the power system; and charging and discharging for stabilizing frequencies in the power system. Electric power acquired by the continuous discharging of the electric vehicle for maintaining supply-demand balance is used as "spinning reserve" of the power system. This continuous discharging for the spinning reserve is done especially for the supply of electric power to the power system which is needed in order to maintain supply-demand balance as the demand for electric power in the power system increases. Meanwhile, electric power interchanged by the charging and discharging of the electric vehicle for stabilizing frequencies is used for "frequency regulation" of the power system. In both cases, the electric vehicle helps to stabilize the power system.

Figure 4:
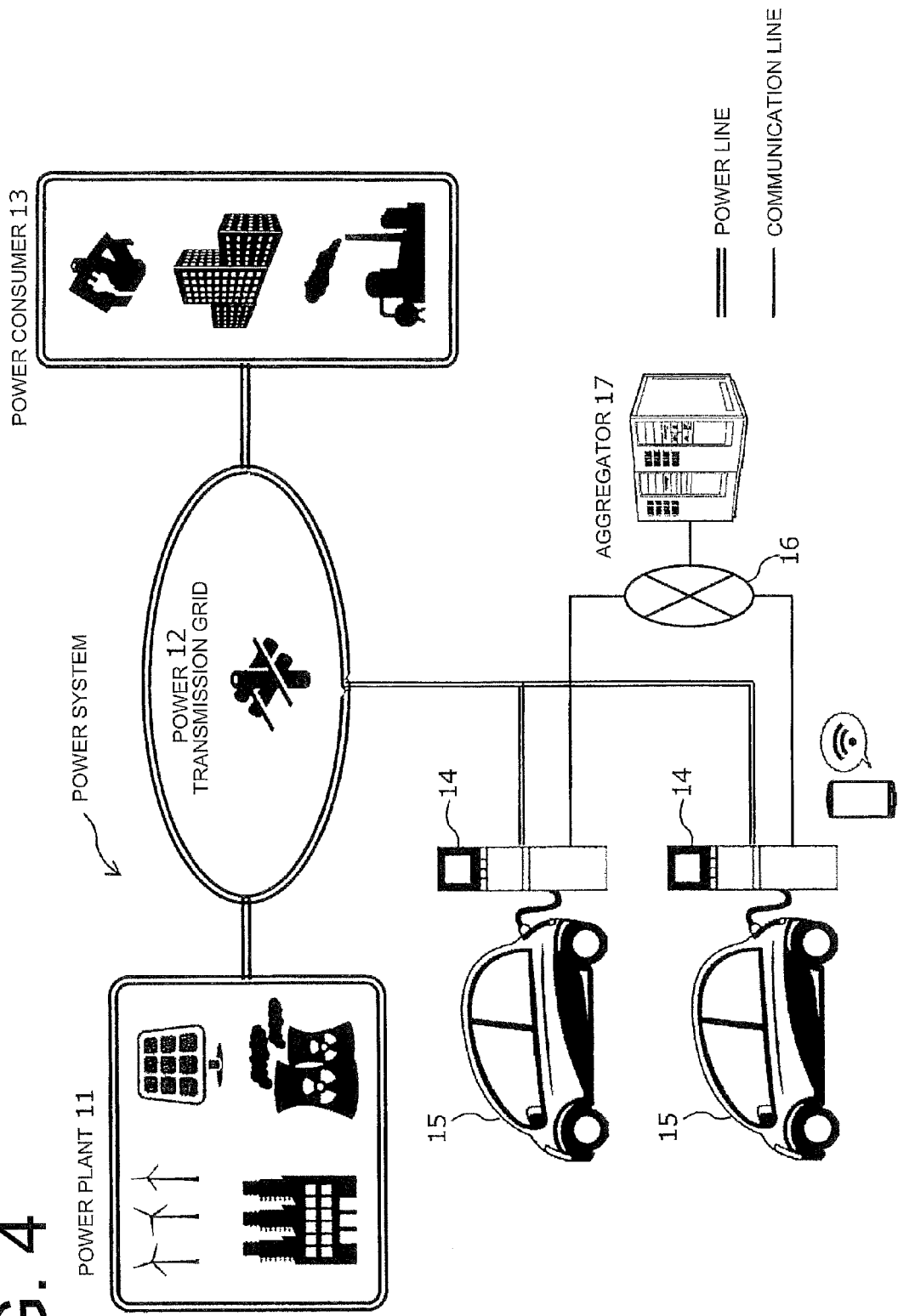
FIG. 4 is a diagram illustrating an overall configuration of a V2G system.

FIG. 4 is a diagram illustrating an overall configuration of the V2G system. As illustrated in FIG. 4, the V2G system includes: a power system composed of a power plant 11 that generates electricity using energy such as thermal power, wind power, nuclear power, or sunlight, a power transmission grid 12 for electric power generated by power suppliers including the power plant 11, and the like; a power consumer 13 that needs electricity and receives electric power supply; an external power supply device 14 that is connected to the power transmission grid 12 via a power distribution facility (not illustrated) and the like; an electric vehicle 15, such as an electrical vehicle (EV) or a plug-in hybrid electric vehicle (PHEV), that has the electric condensers capable of charging and discharging described above; a communication network 16; and an aggregator 17 that manages charging and discharging of the electric condensers in the electric vehicle 15 via the external power supply device 14 connected to the communication network 16. The aggregator 17 can meet the demand of a power company that runs the power plant 11, a power transmission company that runs the power transmission grid 12, or the like by managing the charging and discharging of multiple electric storage devices including the electric condensers of the electric vehicle 15.

Figure 5:
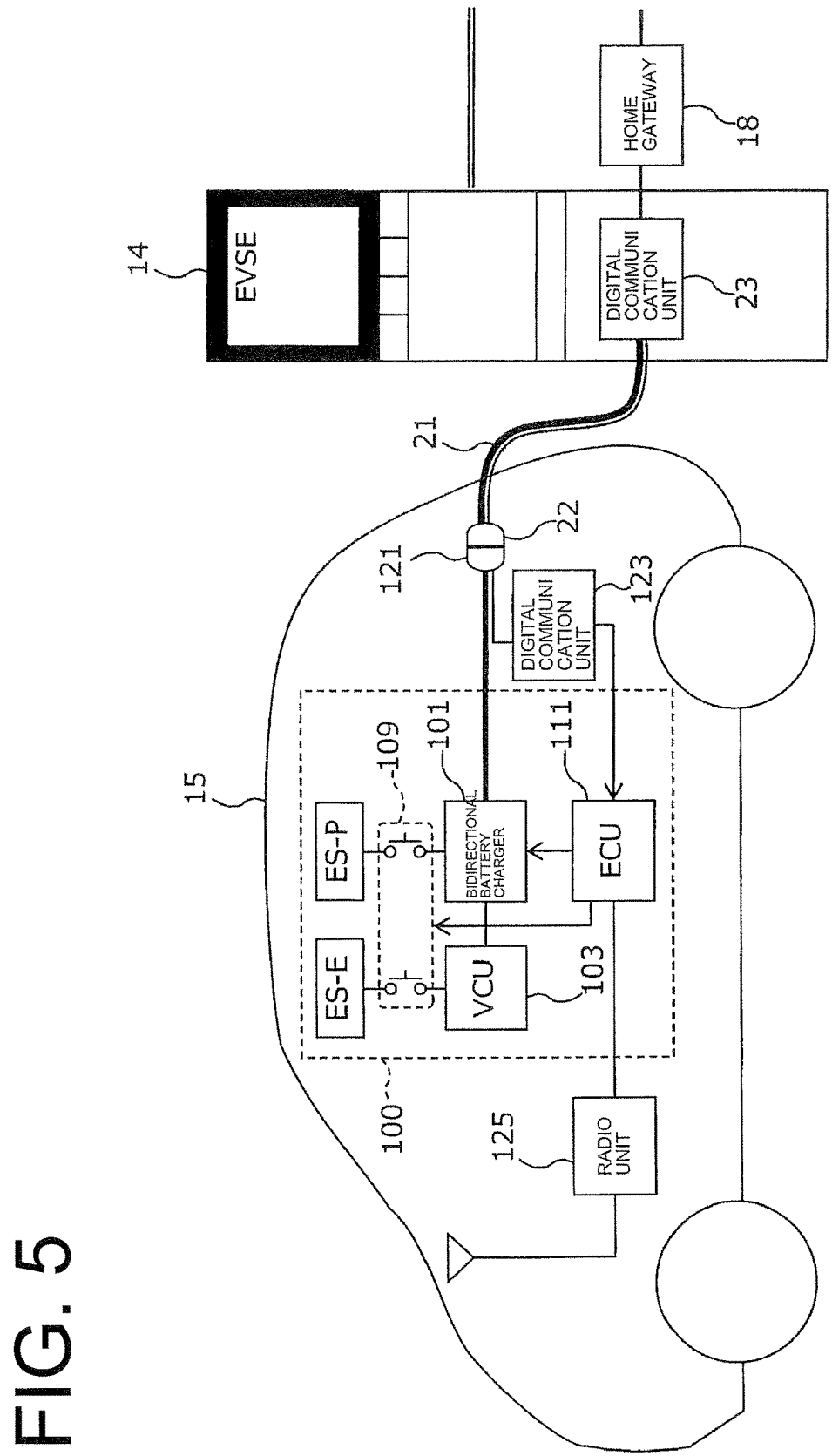
FIG. 5 is a block diagram illustrating an external power supply device and an electric vehicle constituting a part of the V2G system illustrated in FIG. 4.

FIG. 5 is a block diagram illustrating the external power supply device 14 and the electric vehicle 15 constituting a part of the V2G system illustrated in FIG. 4. As illustrated in FIG. 5, the external power supply device 14 includes: a connector 22 that is placed at the tip of a cable 21; and a digital communication unit 23. Meanwhile, the electric vehicle 15 includes: the electric storage device 100 of this embodiment described above; an inlet 121; a digital communication unit 123; and a radio unit 125.

Hereinbelow, the constituents of the external power supply device 14 are described.

The connector 22 interchanges electric power between the external power supply device 14 and the electric vehicle 15 in a state of being connected to the inlet 121 of the electric vehicle 15. The digital communication unit 23 is connected to the communication network 16 via a home gateway 18, and is configured to superimpose a signal acquired from the aggregator 17 on electricity interchanged between the external power supply device 14 and the electric vehicle 15, by use of power line communication technology. Thus, a control signal from the aggregator 17 is sent to the electric vehicle 15 if the connector 22 is in the state of being connected to the inlet 121 of the electric vehicle 15.

Next, the constituents of the electric vehicle 15 are described. Note that the electric storage device 100 is as has been described above with reference to FIGS. 1 to 3.

The connector 22 of the external power supply device 14 is attachable to and detachable from the inlet 121. The digital communication unit 123 is configured to receive, in the state where the connector 22 of the external power supply device 14 is mounted on the inlet 121, the signal that has been superimposed on the electricity from the external power supply device 14 by the power line communication (digital communication) technology and, when the electric vehicle 15 joins the V2G, execute an operation according to the command instructed by this signal. Note that the connection mode between the electric vehicle 15 and the external power supply device 14 is not limited to a physical connection between the inlet 121 and the connector 22, and may be an electromagnetic connection such as non-contact charging and discharging in a state where the inlet 121 and the connector 22 are close to each other. The radio unit 125 is configured to send, by radio, the aggregator 17 information on whether the electric vehicle 15 joins the V2G or not, the number and type of electric condensers the electric vehicle 15 has, and the like. Here, whether the electric vehicle 15 joins the V2G or not and the number and type of electric condensers the electric vehicle 15 has are set in advance by the owner of the electric vehicle 15.

Figure 6:
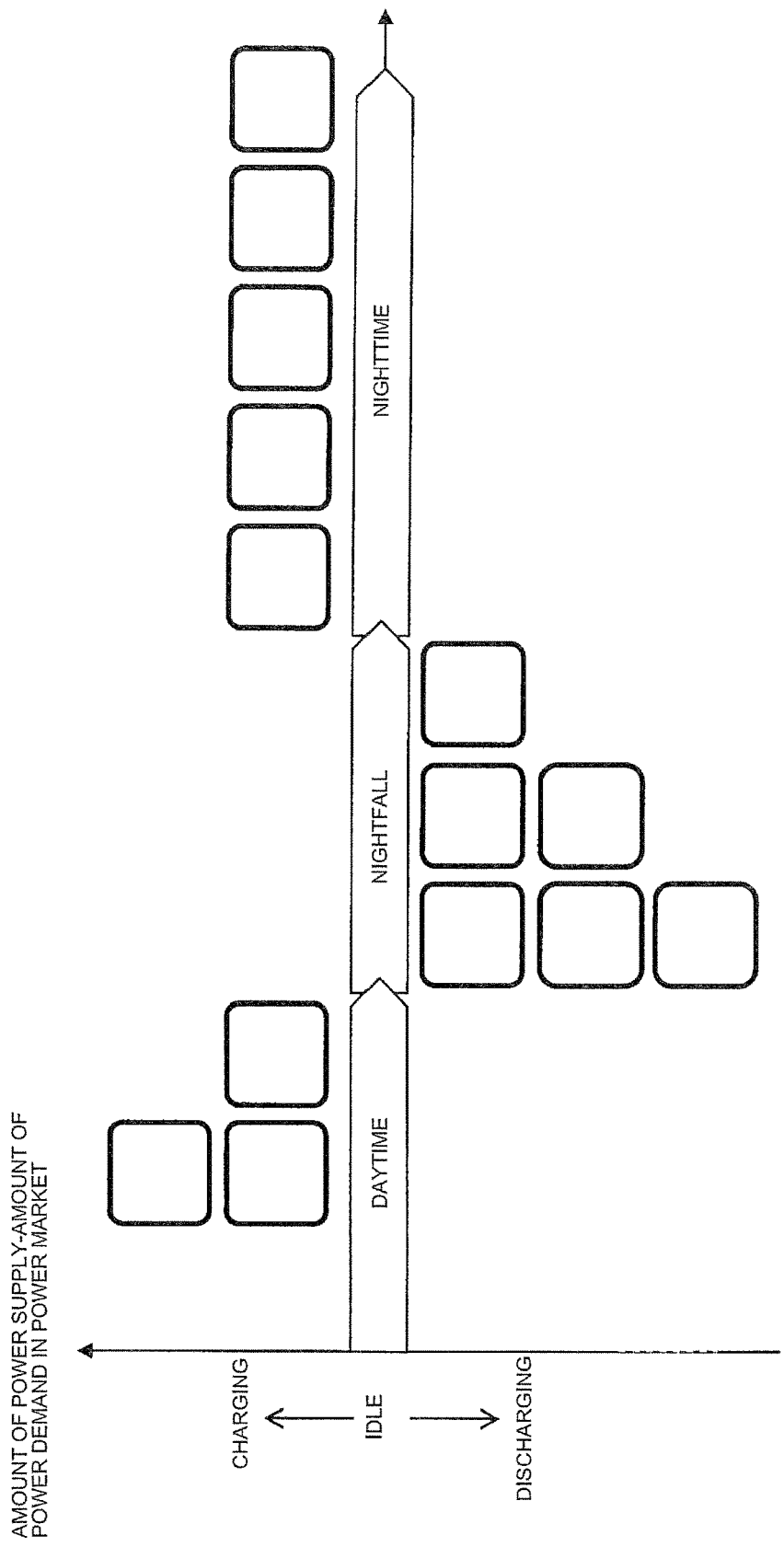
FIG. 6 is a chart illustrating an example of supply-demand balance in the power market in time slots from daytime to nighttime.

FIG. 6 is a chart illustrating an example of supply-demand balance in the power market in time slots from daytime to nighttime. As illustrated in FIG. 6, in the power market in the daytime until around 5 p.m., the amount of power supply is sufficient for the amount of power demand, and therefore the aggregator 17 instructs the electric vehicle 15 that can join the V2G to perform the charging and discharging for the frequency regulation in the power system. However, during the period when the night falls, i.e., about two hours from around 6 p.m., the amount of power supply is short of the amount of power demand, and therefore the aggregator 17 instructs the electric vehicle 15 that can join the V2G to perform the continuous discharging for providing the spinning reserve to the power system. Then, in the nighttime, the amount of power supply becomes sufficient for the amount of power demand again, and therefore the aggregator 17 instructs the electric vehicle 15 that can join the V2G to perform the charging and discharging for the frequency regulation in the power system.

Note that an incentive obtained by performing the continuous discharging for providing the spinning reserve is higher than an incentive obtained by performing the charging and discharging for the frequency regulation. The incentive is a return that the owner of the electric vehicle 15 gets when the electric vehicle 15 buys and sells electric power through the charging and discharging, and the return is mainly money.

Next, a description is given of the charging/discharging control carried out by the electric storage device 100 of the electric vehicle 15 that can execute the continuous discharging for providing the spinning reserve and the charging and discharging for the frequency regulation with the power system.

Figure 7:
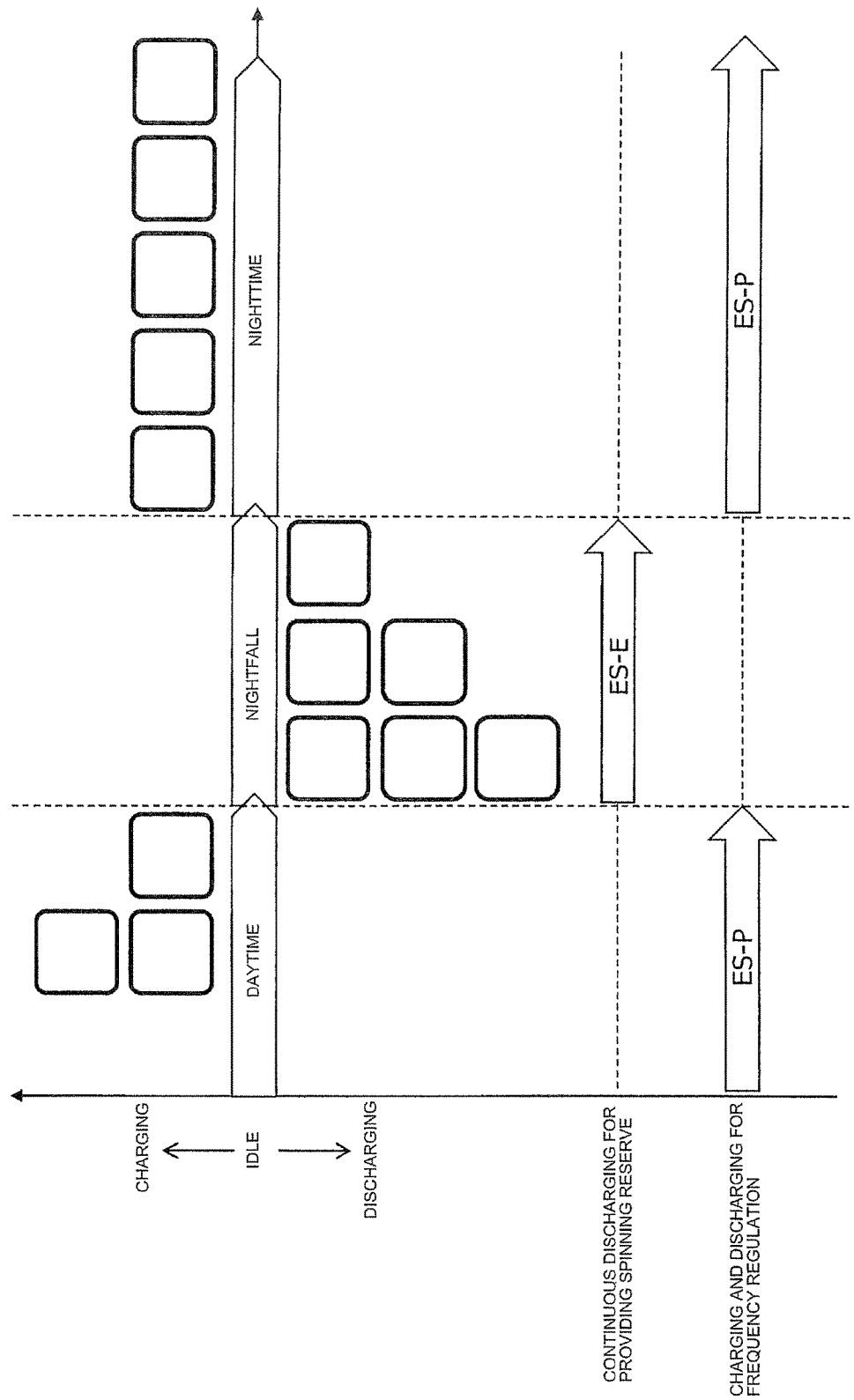
FIG. 7 is a chart illustrating a correspondence between charging and discharging done by the electric storage device of the electric vehicle that joins the V2G, and the batteries performing the charging and discharging.

As illustrated in FIG. 1, the electric storage device 100 of the electric vehicle 15 includes the high-capacity battery ES-E and the high-output battery ES-P having different characteristics. As illustrated in FIG. 3, the charging and discharging mode preferable for the characteristics of the high-capacity battery ES-E is the mode of continuously charging and discharging constant electric power at a low or medium level. Meanwhile, the charging and discharging mode preferable for the characteristics of the high-output battery ES-P is the mode of instantaneously charging and discharging electric power at a medium or large level. As illustrated in FIG. 6, during the nightfall, the power system is short of electric power and thus it needs a relatively large amount of spinning reserve. For this reason, in this embodiment, as illustrated in FIG. 7, the high-capacity battery ES-E is in charge of the continuous discharging for providing the spinning reserve in the electric vehicle 15 joining the V2G. On the other hand, the frequency regulation is necessary for the power system at any time slot, and it needs instantaneous electric power shift. For this reason, in this embodiment, as illustrated in FIG. 7, the high-output battery ES-P is in charge of the charging and discharging for the frequency regulation in the electric vehicle 15 joining the V2G.

Figure 8:
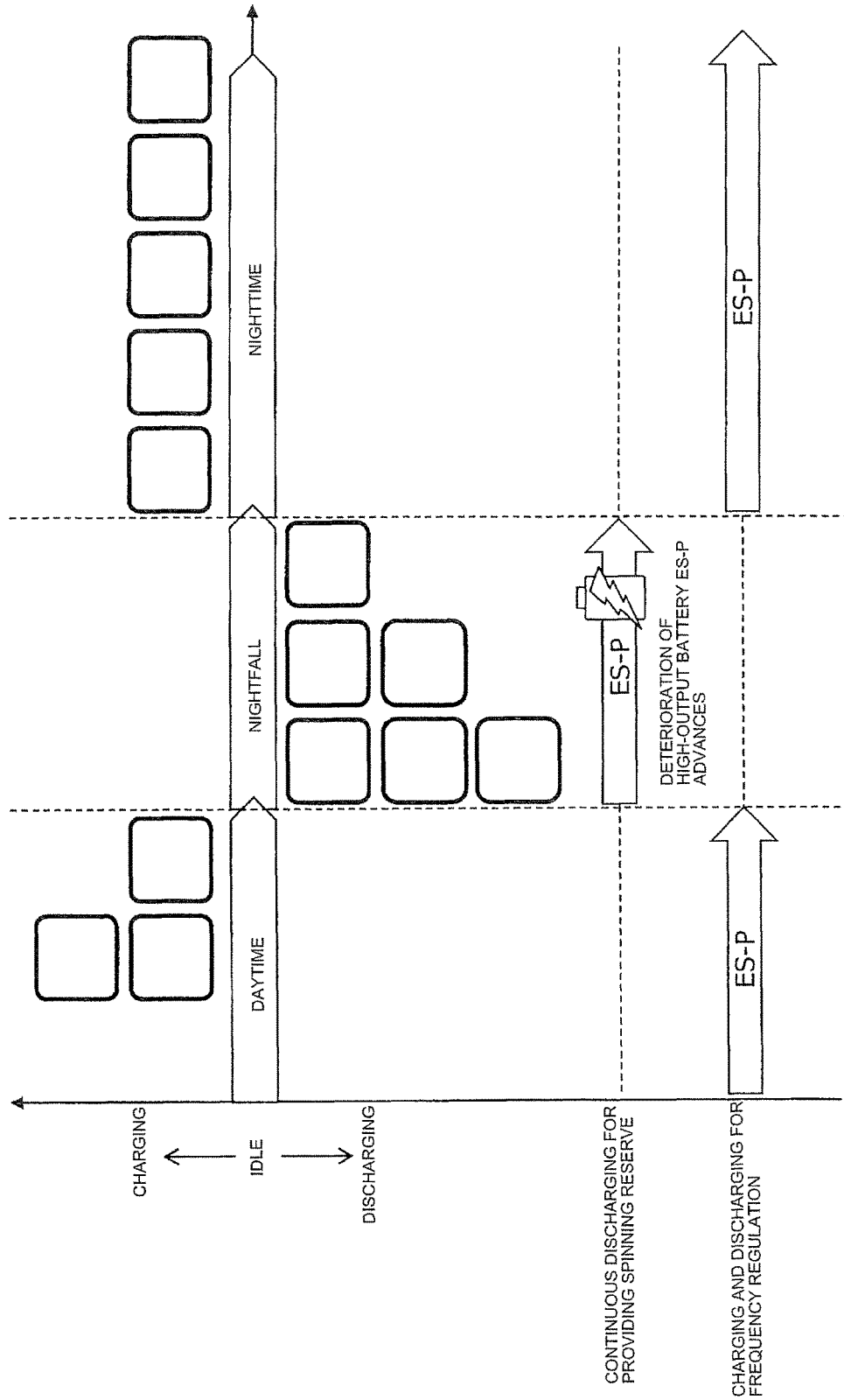
FIG. 8 is a chart illustrating a case where the high-output battery solely performs the charging and discharging done by the electric storage device of the electric vehicle that joins the V2G.
Figure 9:
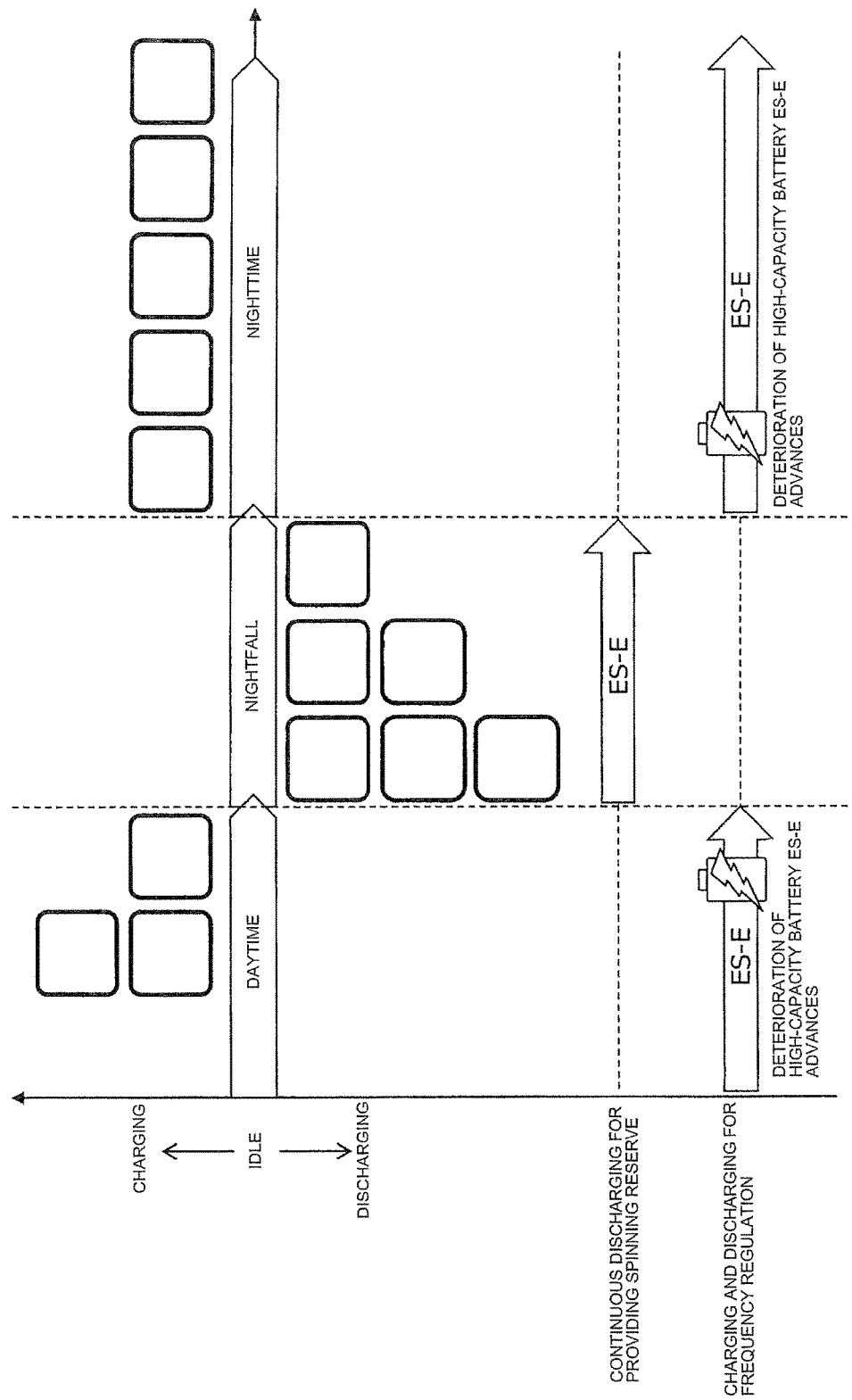
FIG. 9 is a chart illustrating a case where the high-capacity battery solely performs the charging and discharging done by the electric storage device of the electric vehicle that joins the V2G.

Assuming that the high-output battery ES-P is in charge of the continuous discharging for providing the spinning reserve as illustrated in FIG. 8, the SOC of the high-output battery ES-P keeps decreasing. In this case, if the SOC falls below the lower limit of the preferable range illustrated in FIG. 2, the high-output battery ES-P is discharged under a high capacity deterioration coefficient, which advances deterioration of the high-output battery ES-P. Moreover, since the high-output battery ES-P has a smaller capacity than the high-capacity battery ES-E, an incentive obtained by the discharging is reduced. Meanwhile, assuming that the high-capacity battery ES-E is in charge of the charging and discharging for the frequency regulation as illustrated in FIG. 9, the high-capacity battery ES-E performs charging and discharging instantaneously and frequently, which advances deterioration of the high-capacity battery ES-E.

Here, in this embodiment, when the high-output battery ES-P performs the charging and discharging for the frequency regulation, it is judged through a simulation whether the SOC of the high-output battery ES-P deviates from the preferable range illustrated in FIG. 2 by the charging and discharging and, if it is judged that the SOC deviates from the preferable range, electric power is shifted between the high-output battery ES-P and the high-capacity battery ES-E. In which direction the electric power is to be shifted between the high-output battery ES-P and the high-capacity battery ES-E is determined according to a result obtained by adding or subtracting a predetermined value to or from the SOC of the high-output battery ES-P, and the amount of electric power to be shifted is determined according to the amount the SOC deviates from the preferable range. Accordingly, if a value obtained by adding the predetermined value to the SOC of the high-output battery ES-P exceeds the upper limit of the preferable range, for example, the high-output battery ES-P discharges power into the high-capacity battery ES-E. In this case, this electric power shift increases the SOC of the high-capacity battery ES-E, and thus can increase the amount of electric power the high-capacity battery ES-E can provide when performing the continuous discharging for the spinning reserve.

Meanwhile, when the aggregator 17 instructs the electric vehicle 15 to perform the charging and discharging for the frequency regulation and, at the same time, perform the continuous discharging for providing the spinning reserve, the instruction to perform the continuous discharging for providing the spinning reserve is given a higher priority. In this embodiment, the incentive for the continuous discharging for providing the spinning reserve is set higher than the incentive for the charging and discharging for the frequency regulation. Hence, the incentive that the owner of the electric vehicle 15 can get can be maximized by giving a higher priority to the continuous discharging for providing the spinning reserve when the two instructions are given at the same time.

Figure 10:
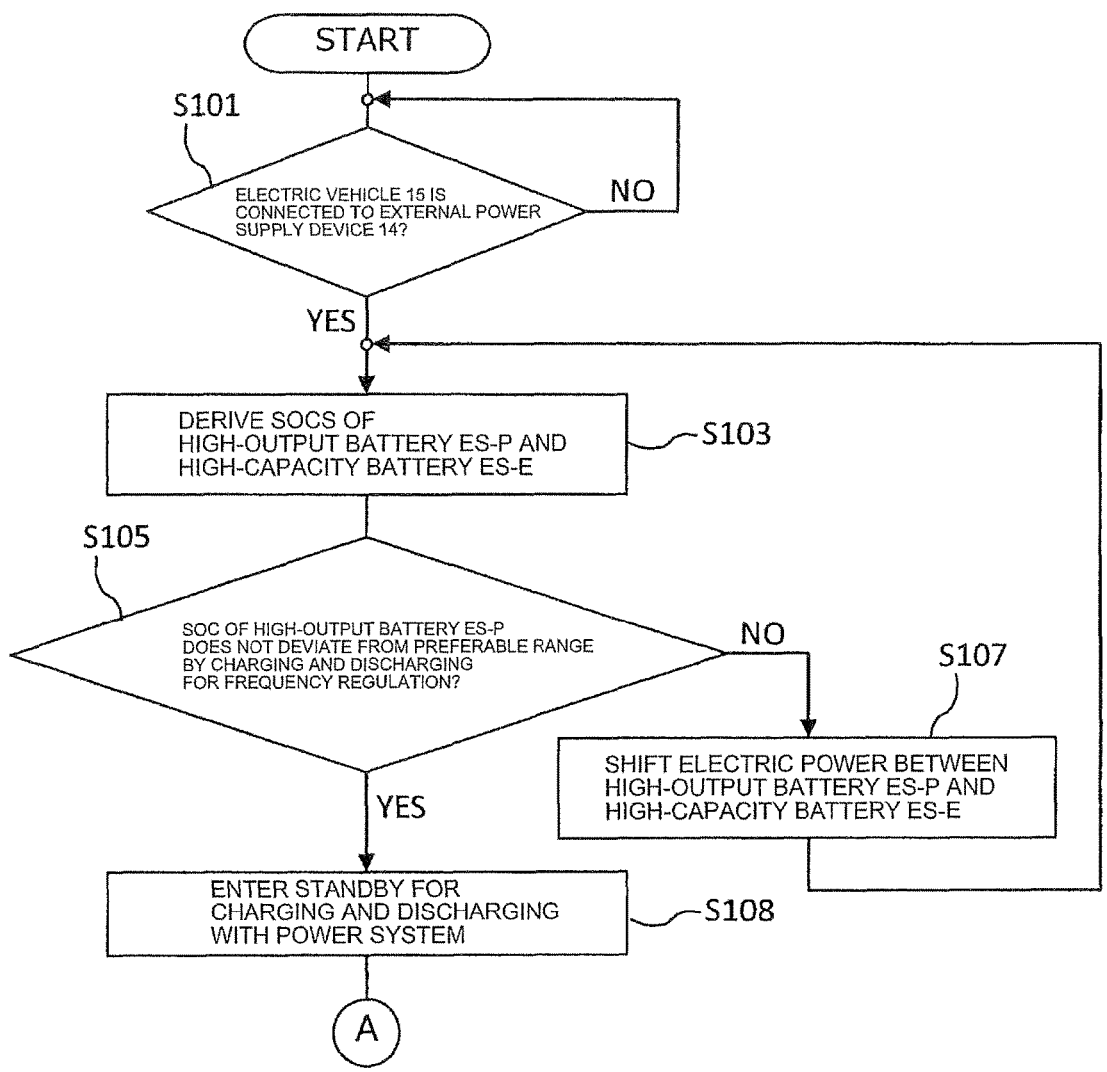
FIG. 10 is a flowchart illustrating an example of a flow of processes performed by an ECU of an electric storage device 100 when an electric vehicle 15 joining the V2G performs charging and discharging with a power system.
Figure 11:
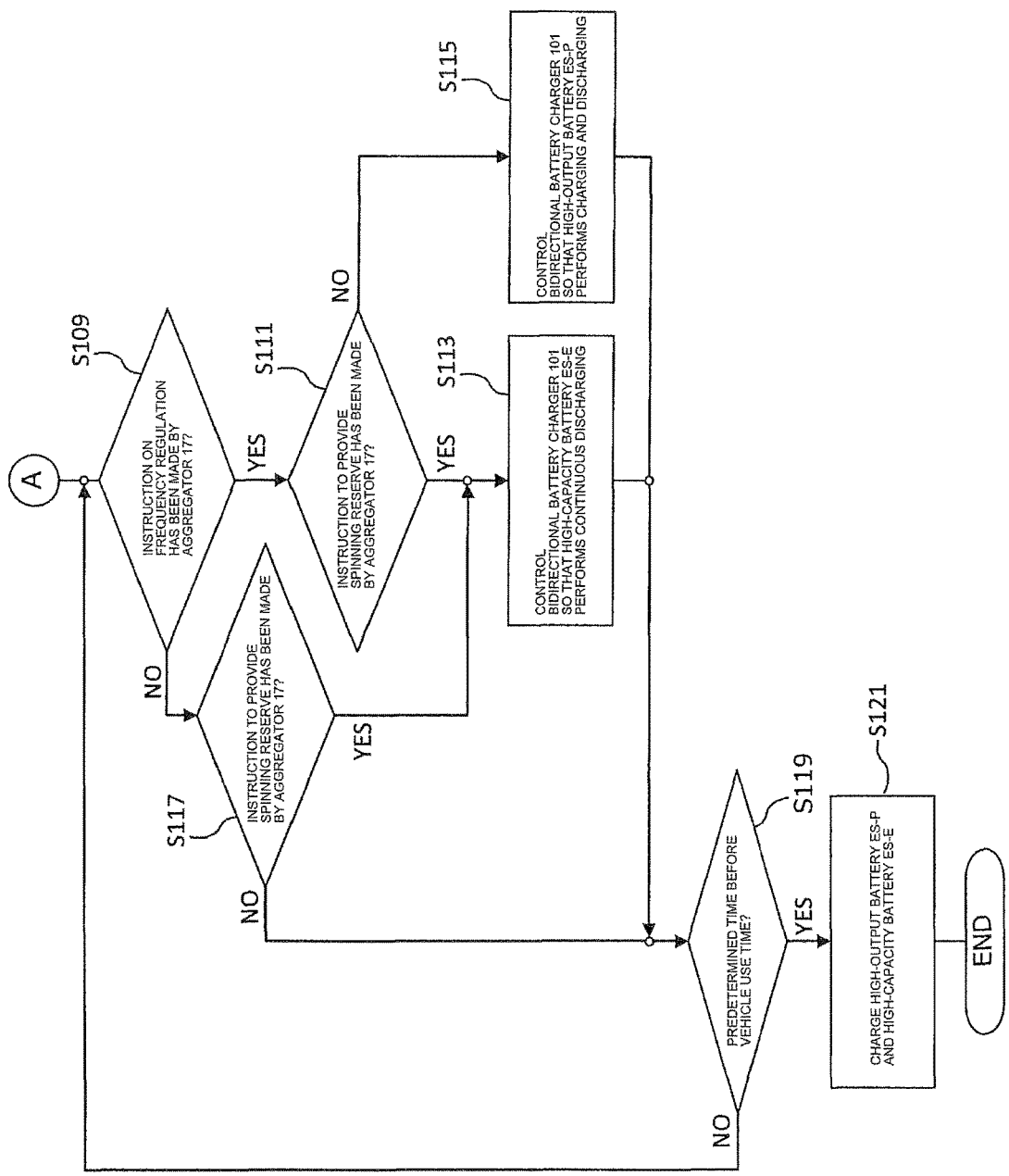
FIG. 11 is a flowchart illustrating the example of the flow of processes performed by the ECU of the electric storage device 100 when the electric vehicle 15 joining the V2G performs the charging and discharging with the power system.

FIGS. 10 and 11 are flowcharts illustrating an example of a flow of processes performed by the ECU 111 of the electric storage device 100 when the electric vehicle 15 joining the V2G performs charging and discharging with the power system. As illustrated in FIG. 10, if the inlet 121 of the electric vehicle 15 is connected to the connector 22 of the external power supply device 14 (YES at Step S101), the ECU 111 derives the SOCs of the high-output battery ES-P and the high-capacity battery ES-E (Step S103). Next, the ECU 111 estimates a shift in the SOC of the high-output battery ES-P to be observed when the high-output battery ES-P performs the charging and discharging for the frequency regulation. If the SOC of the high-output battery ES-P does not deviate from the preferable range illustrated in FIG. 2 by the charging and discharging, the process proceeds to Step S108; and if it deviates, the process proceeds to Step S107.

At Step S107, the ECU 111 controls the VCU 103 so as to shift electric power between the high-output battery ES-P and the high-capacity battery ES-E, and then the process goes back to Step S103. On the other hand, at Step S108, the electric vehicle 15 enters a standby mode where the vehicle is ready for charging and discharging with the power system.

After Step S108, the ECU 111 judges whether the aggregator 17 has instructed the electric vehicle 15 to perform the charging and discharging for the frequency regulation in the power system (Step S109). If the instruction has been given, the process proceeds to Step S111 and, if the instruction has not been given, the process proceeds to Step S117. At Step S111, the ECU 111 judges whether the aggregator 17 has instructed the electric vehicle 15 to perform the continuous discharging for providing the spinning reserve to the power system. If the instruction has been given, the process proceeds to Step S113 and, if the instruction has not been given, the process proceeds to Step S115.

At Step S113, the ECU 111 controls the bidirectional battery charger 101 so that the high-capacity battery ES-E performs the continuous discharging for providing the spinning reserve. Meanwhile, at Step S115, the ECU 111 controls the bidirectional battery charger 101 so that the high-output battery ES-P performs the charging and discharging for the frequency regulation.

Meanwhile, at Step S117, the ECU 111 judges whether the aggregator 17 has instructed the electric vehicle 15 to perform the continuous discharging for providing the spinning reserve to the power system. If the instruction has been given, the process proceeds to Step S113 and, if the instruction has not been given, the process proceeds to Step S119. At Step S119, the ECU 111 judges whether or not it is a predetermined time before the expected time to use the electric vehicle 15 and, if it is the predetermined time before this expected use time, the process proceeds to Step S121. At Step S121, the ECU 111 controls the bidirectional battery charger 101 so as to charge both the high-output battery ES-P and the high-capacity battery ES-E.

Figure 12:
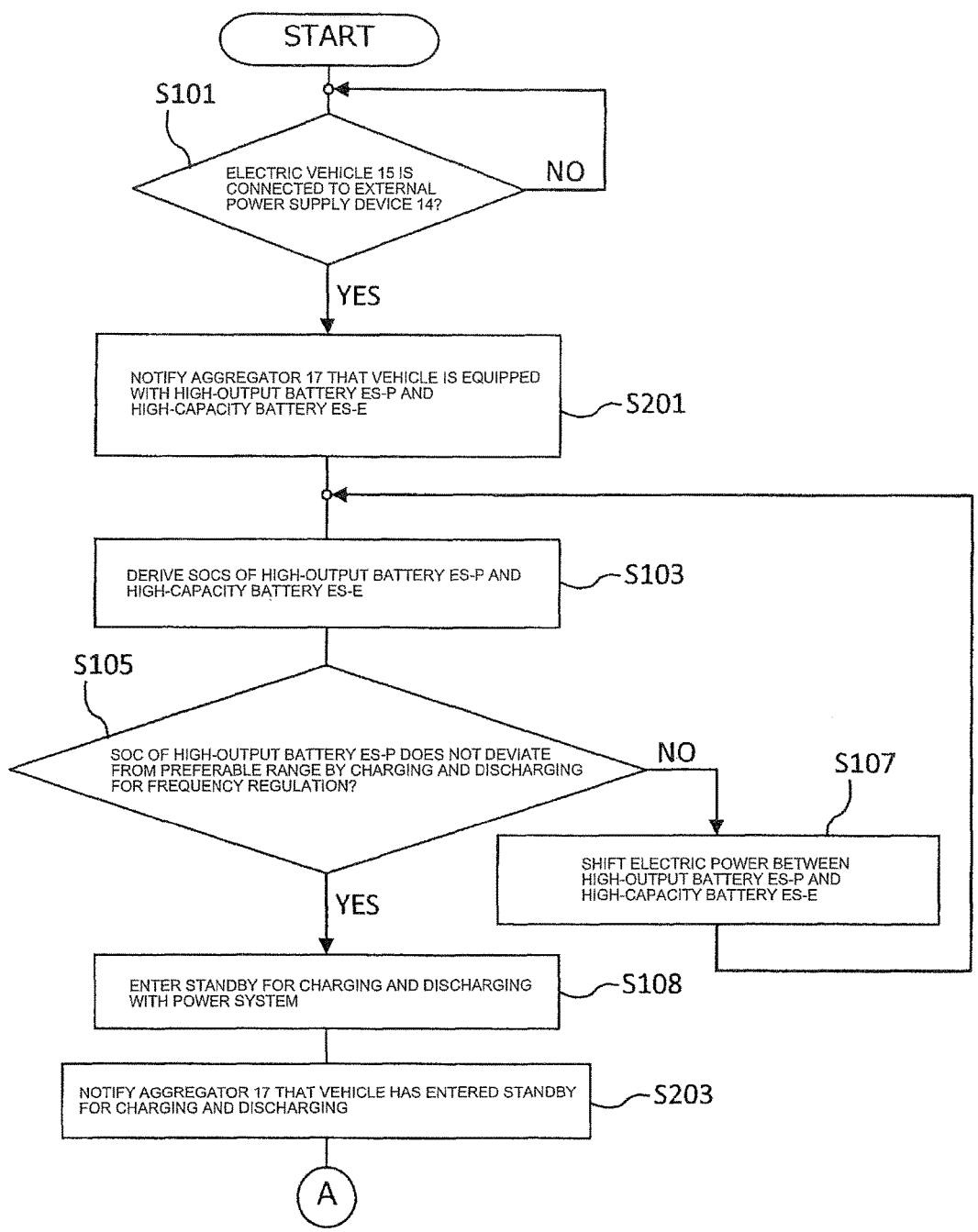
FIG. 12 is a flowchart illustrating another example of a flow of processes performed by the ECU of the electric storage device 100 when the electric vehicle 15 joining the V2G performs charging and discharging with the power system.

FIG. 12 is a flowchart illustrating another example of a flow of processes performed by the ECU 111 of the electric storage device 100 when the electric vehicle 15 joining the V2G performs charging and discharging with the power system. Here, the same or equivalent parts of Steps illustrated in FIG. 12 as those of Steps illustrated in FIG. 10 are given the same or equivalent reference numerals and their description is simplified or omitted. In the example illustrated in FIG. 12, if judging at Step S101 that the inlet 121 of the electric vehicle 15 is connected to the connector 22 of the external power supply device 14, the ECU 111 notifies, by communication, the aggregator 17 that the electric vehicle 15 is a vehicle equipped with the high-output battery ES-P and the high-capacity battery ES-E (Step S201) before the ECU carries out Step S103. In addition, after Step S108, the ECU 111 notifies, by communication, the aggregator 17 that the electric vehicle 15 is in a standby mode where the vehicle is ready for charging and discharging with the power system (Step S203) before the ECU carries out Step S109. Processes at and after Step S109 are the same as the processes described with FIG. 11. Here, if the aggregator 17 in this example is notified by the electric vehicle 15 that the vehicle is equipped with the high-output battery ES-P and the high-capacity battery ES-E, the aggregator gives an instruction after being notified by the electric vehicle 15 that the vehicle is in the standby mode where the vehicle is ready for charging and discharging with the power system.

As has been described, according to this embodiment, the high-capacity battery ES-E has such characteristics that it is inferior in output weight density but superior in energy weight density, and it does not deteriorate easily by the continuous discharging; meanwhile, the high-output battery ES-P has such characteristics that it is superior in output weight density but inferior in energy weight density, and it does not deteriorate easily by the repetitive charging and discharging as long as the SOC falls within the preferable range. In the electric storage device 100 equipped with these two batteries having different characteristics, the device controls the high-capacity battery ES-E in a manner suitable for this battery, i.e., so that the high-capacity battery ES-E is solely in charge of the continuous discharging, and controls the high-output battery ES-P in a manner suitable for this battery, i.e., so that the high-output battery ES-P is in charge of the charging and discharging for stabilizing frequencies in the power system. This makes it possible to suppress deterioration of the batteries while interchanging electric power between the device and the power system. Accordingly, the owner of the electric vehicle 15 can get an incentive while deterioration of the batteries is suppressed. This increases owners who join the V2G and the like, and thereby improves quality of the power system.

In addition, the continuous discharging performed by the high-capacity battery ES-E is discharging aiming for the maintenance of supply-demand balance in the power system, and for the supply of electric power to the power system or the supply of the spinning reserve to the power system which is needed in order to maintain supply-demand balance as the demand for electric power in the power system increases, and therefore this is suitable for the high-capacity battery ES-E. Accordingly, if the high-capacity battery ES-E performs the continuous discharging, the owner of the electric storage device can get an incentive while deterioration of the high-capacity battery ES-E is suppressed. This increases owners who join the V2G and the like, and thereby improves quality of the power system.

If the capacity deterioration coefficient corresponding to a value obtained by adding or subtracting the predetermined value to or from the SOC of the high-output battery ES-P obtained before the charging and discharging for the frequency regulation is equal to or larger than a threshold, the SOC of the high-output battery ES-P is adjusted in advance, by charging and discharging between the high-capacity battery ES-E and the high-output battery ES-P, in order that the capacity deterioration coefficient corresponding to the SOC of the high-output battery ES-P may not become equal to or larger than the threshold by the charging and discharging for the frequency regulation. This minimizes deterioration along with the shift in the SOC caused when the high-output battery ES-P performs the charging and discharging for the frequency regulation.

Meanwhile, if the capacity deterioration coefficient corresponding to a value obtained by adding the predetermined value to the SOC of the high-output battery ES-P before the charging and discharging for the frequency regulation is equal to or larger than the threshold, the electric power of the high-output battery ES-P is shifted to the high-capacity battery ES-E in advance, by discharging from the high-output battery ES-P to the high-capacity battery ES-E, in order that the capacity deterioration coefficient corresponding to the SOC of the high-output battery ES-P may not become equal to or larger than the threshold by the charging and discharging for the frequency regulation. This minimizes deterioration caused when the high-output battery ES-P performs the charging and discharging for the frequency regulation. In addition, since the SOC of the high-capacity battery ES-E is increased by the discharging from the high-output battery ES-P to the high-capacity battery ES-E, it is possible to increase the amount of electric power available when the high-capacity battery ES-E performs the continuous discharging for the spinning reserve. This brings about a special effect that incentive maximization and suppression of battery deterioration, which are difficult to go together, can be solved at the same time, which increases owners who join the V2G and the like and thereby improves quality of the power system.

Further, the predetermined value, used when it is judged whether or not to perform charging and discharging between the high-capacity battery ES-E and the high-output battery ES-P in advance before the charging and discharging for the frequency regulation, is set based on the amount of shift in the SOC observed when the high-output battery ES-P performs the charging and discharging for the frequency regulation. Thereby, it is possible to optimize the SOC of the high-output battery ES-P at the time of the charging and discharging for the frequency regulation while preventing a reduction of an incentive due to power loss caused by excessive electric power shift between the high-output battery ES-P and the high-capacity battery ES-E.

Furthermore, since the incentive for the continuous discharging for the spinning reserve is higher than the incentive for the charging and discharging for the frequency regulation. Thus, when both of these charging and discharging instructions are given, the continuous discharging for the spinning reserve is performed with a higher priority than the charging and discharging for the frequency regulation. Thereby, the incentive that the owner of the electric vehicle 15 can get can be maximized, which increases owners who join the V2G and the like and thereby improves quality of the power system.

Note that the present invention is not limited to the foregoing embodiment, and modification, improvement, and the like can be made as needed. For example, although the electric vehicle described above is the single-motor electrical vehicle (EV), it may be an EV equipped with multiple motor generators, or may be a plug-in hybrid electrical vehicle (PHEV) equipped with at least one motor generator and an internal combustion engine. In addition, although the electric storage device 100 is installed in the electric vehicle in this embodiment, the electric storage device 100 may be provided in electric equipment not designed for transportation. The electric storage device 100 is suitable for power supplies capable of outputting a high current, and is particularly suitable for application to computers which have recently been on a significant higher-current trend.

Figure 13:
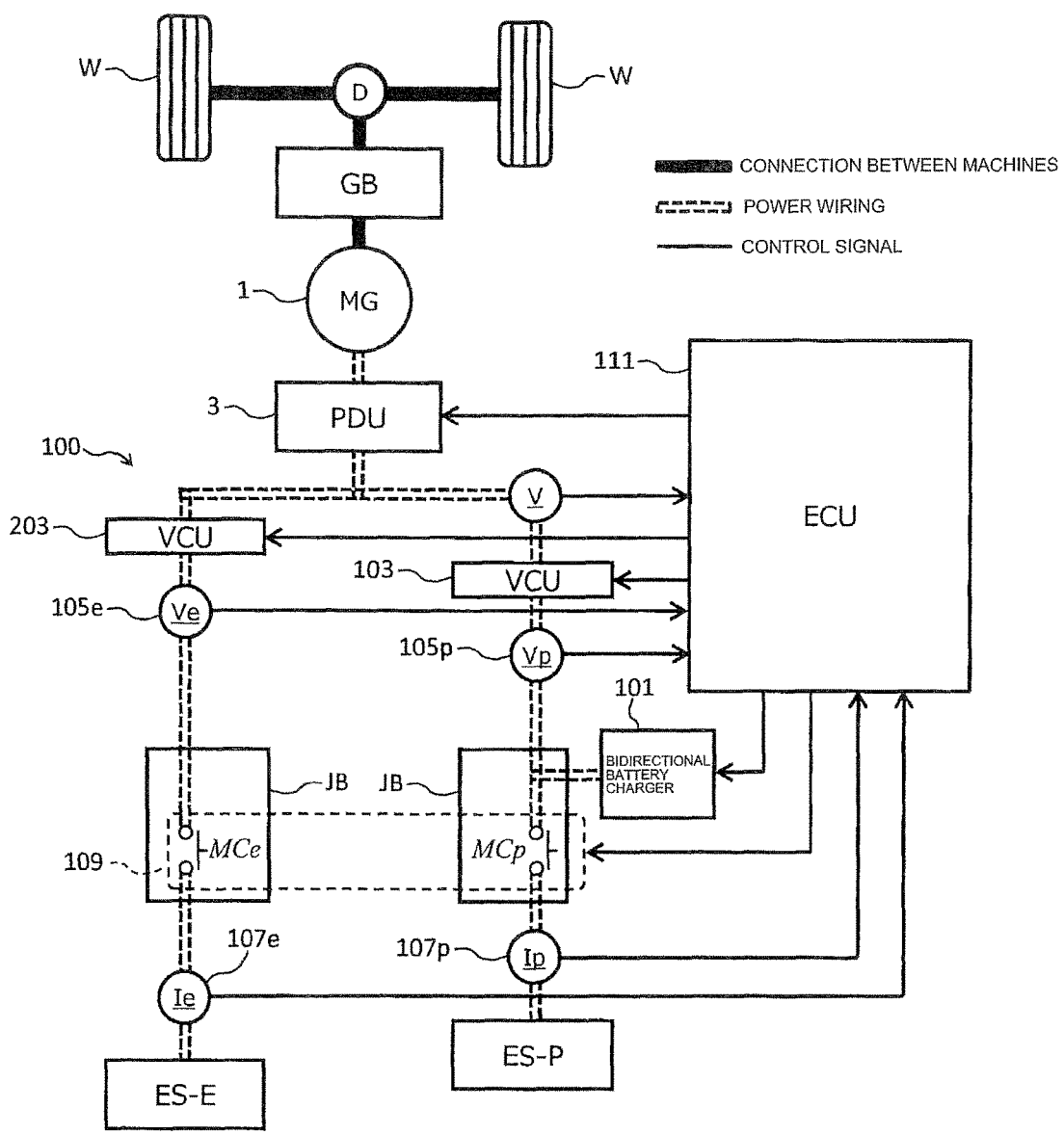
FIG. 13 is a block diagram illustrating a schematic configuration of an electric vehicle equipped with an electric storage device according to another embodiment of the present invention.

The VCU 103 of this embodiment steps up the voltage Vp from the high-output battery ES-P; however, if the voltage Ve from the high-capacity battery ES-E is lower than the voltage Vp from the high-output battery ES-P, a VCU that steps down the voltage Vp from the high-output battery ES-P is used. Alternatively, a VCU capable of bidirectional boosting/bucking may be used. Still alternatively, a VCU 203 may be provided on the high-capacity battery ES-E side as illustrated in FIG. 13. With the two VCUs, the voltage to be applied to the motor generator 1 and the PDU 3 is no longer dependent on that of the high-capacity battery ES-E, thereby improving efficiency.

The first electric condenser is inferior in output weight density and superior in energy weight density. On the other hand, the second electric condenser is superior in output weight density and inferior in energy weight density. These characteristics are caused due to various parameters such as the internal resistance (impedance) and available electric storage capacity of each electric condenser. Because of these characteristics, the first electric condenser is suitable for continuous discharging, and the second electric condenser is suitable for repetition of intermittent charging and discharging. In the electric storage device equipped with these two electric condensers having different characteristics, the first electric condenser is in charge of the first mode, i.e., continuous discharging, which is suitable for the first electric condenser, and the second electric condenser is in charge of the second mode, i.e., intermittent charging and discharging for stabilizing frequencies in the power system, which is suitable for the second electric condenser. This makes it possible to suppress deterioration of the electric condensers while interchanging electric power between the device and the power system. Accordingly, the owner of the electric storage device can get an incentive while deterioration of the electric condensers is suppressed. This increases owners who join the V2G and the like, and thereby improves quality of the power system.

The first electric condenser is inferior in output weight density and superior in energy weight density. On the other hand, the second electric condenser is superior in output weight density and inferior in energy weight density. These characteristics are caused due to various parameters such as the internal resistance (impedance) and available electric storage capacity of each electric condenser. Because of these characteristics, the first electric condenser is suitable for continuous discharging, and the second electric condenser is suitable for repetition of intermittent charging and discharging. In the electric storage device equipped with these two electric condensers having different characteristics, the first electric condenser is in charge of the first mode, i.e., continuous discharging, which is suitable for the first electric condenser, and the second electric condenser is in charge of the second mode, i.e., intermittent charging and discharging, which is suitable for the second electric condenser. This makes it possible to suppress deterioration of the electric condensers while interchanging electric power between the device and the power system. Accordingly, the owner of the electric storage device can get an incentive while deterioration of the electric condensers is suppressed. This increases owners who join the V2G and the like, and thereby improves quality of the power system.

The second mode is intermittent charging and discharging for stabilizing frequencies in the power system, and is suitable for the second electric condenser. Accordingly, if the second electric condenser is in charge of the second mode, the owner of the electric storage device can get an incentive while deterioration of the second electric condenser is suppressed. This increases owners who join the V2G and the like, and thereby improves quality of the power system.

The first mode is continuous discharging for maintaining supply-demand balance in the power system, and is suitable for the first electric condenser. Accordingly, if the first electric condenser is in charge of the first mode, the owner of the electric storage device can get an incentive while deterioration of the first electric condenser is suppressed. This increases owners who join the V2G and the like, and thereby improves quality of the power system.

The first mode is continuous discharging done for the supply of electric power to the power system which is needed in order to maintain supply-demand balance as the demand for electric power in the power system increases, and is suitable for the first electric condenser. Accordingly, if the first electric condenser is in charge of the first mode, the owner of the electric storage device can get an incentive while deterioration of the first electric condenser is suppressed. This increases owners who join the V2G and the like, and thereby improves quality of the power system.

The first mode is continuous discharging to the power system for supplying spinning reserve to the power system, and is suitable for the first electric condenser. Accordingly, if the first electric condenser is in charge of the first mode, the owner of the electric storage device can get an incentive while deterioration of the first electric condenser is suppressed. This increases owners who join the V2G and the like, and thereby improves quality of the power system.

The device can execute both the first and second modes with the power system. Thereby, it is possible to get both an incentive for the first mode and an incentive for the second mode. This increases owners who join the V2G and the like, and thereby improves quality of the power system.

The first mode is performed solely by the first electric condenser. Thereby, deterioration of the second electric condenser can be further suppressed.

The second mode is performed solely by the second electric condenser. Thereby, deterioration of the first electric condenser can be further suppressed.

If the estimated deterioration factor, which is the deterioration factor corresponding to the value obtained by adding or subtracting the predetermined value to or from the charging rate of the second electric condenser obtained before the second mode is performed, is equal to or larger than the threshold, the charging rate of the second electric condenser is adjusted in advance, by charging and discharging between the first electric condenser and the second electric condenser, in order that the estimated deterioration factor may not become equal to or larger than the threshold by the second mode. This minimizes deterioration along with the shift in the charging rate caused when the second electric condenser performs the second mode.

If the estimated deterioration factor, which is the deterioration factor corresponding to the value obtained by adding the predetermined value to the charging rate of the second electric condenser obtained before the second mode is performed, is equal to or larger than the threshold, the electric power of the second electric condenser is shifted to the first electric condenser in advance, by discharging from the second electric condenser to the first electric condenser, in order that the estimated deterioration factor may not become equal to or larger than the threshold by the second mode. This minimizes deterioration caused when the second electric condenser performs the second mode. In addition, since the charging rate of the first electric condenser is increased by the discharging from the second electric condenser to the first electric condenser, it is possible to increase the amount of electric power available when the first electric condenser performs the first mode. This brings about a special effect that incentive maximization and suppression of electric condenser deterioration, which are difficult to go together, can be solved at the same time, which increases owners who join the V2G and the like and thereby improves quality of the power system.

The predetermined value, used when it is judged whether or not to perform charging and discharging between the first electric condenser and the second electric condenser in advance before the second mode is performed, is set based on the amount of shift in the charging rate observed when the second electric condenser performs the charging and discharging for stabilizing frequencies in the power system. Thereby, it is possible to optimize the charging rate of the second electric condenser at the time of the second mode while preventing a reduction of an incentive due to power loss caused by excessive electric power shift between the first electric condenser and the second electric condenser.

If an incentive for the first mode is higher than an incentive for the second mode, the first mode is performed with a higher priority than the second mode. Thereby, the incentive that the owner of the electric storage device can get can be maximized, which increases owners who join the V2G and the like and thereby improves quality of the power system.

When both the instruction to execute the first mode and the instruction to execute the second mode are given, the first mode is performed with a higher priority than the second mode. Thereby, the incentive that the owner of the electric storage device can get can be maximized, which increases owners who join the V2G and the like and thereby improves quality of the power system.

Obviously, numerous modifications and variations of the present invention are possible in light of the above teachings. It is therefore to be understood that within the scope of the appended claims, the invention may be practiced otherwise than as specifically described herein.

What is claimed is:

1. An electric storage device comprising:
a first electric capacitor having first output weight density and first energy weight density;
a second electric capacitor having second output weight density larger than the first output weight density and second energy weight density smaller than the first energy weight density;
a converter to convert electric power transmitted between an external power system external to the electric storage device and at least one of the first electric capacitor and second electric capacitor; and
a processor configured to control the converter to operate in at least one of a first mode and a second mode, the first electric capacitor continuously discharging electric power to the external power system in the first mode, the second electric capacitor discharging electric power to the external power system and being charged by the external power system, intermittently, to stabilize frequencies in the external power system in the second mode.

2. An electric storage device comprising:
a first electric capacitor having first output weight density and first energy weight density;
a second electric capacitor having second output weight density larger than the first output weight density and second energy weight density smaller than the first energy weight density;
a converter to convert electric power transmitted between an external power system external to the electric storage device and at least one of the first electric capacitor and second electric capacitor; and
a processor configured to control the converter to operate in at least one of a first mode and a second mode, the first electric capacitor continuously discharging electric power to the external power system in the first mode in a way of being suitable for characteristics of the first electric capacitor, the second electric capacitor discharging electric power to the external power system and being charged by the external power system, intermittently, in a way of being suitable for characteristics of the second electric capacitor.

3. The electric storage device according to claim 2, wherein the second mode is the charging and discharging for stabilizing frequencies in the external power system.

4. The electric storage device according to claim 1, wherein the first mode is the discharging for maintaining supply-demand balance in the external power system.

5. The electric storage device according to claim 1, wherein the first mode is the discharging done for supply of electric power to the external power system which is needed in order to maintain supply-demand balance as a demand for electric power in the external power system increases.

6. The electric storage device according to claim 1, wherein the first mode is the discharging for supplying spinning reserve to the external power system.

7. The electric storage device according to claim 1, wherein the processor controls the converter so as to be capable of executing both of the first and second modes with the external power system.

8. The electric storage device according to claim 1, wherein the first mode is performed solely by the first electric capacitor.

9. The electric storage device according to claim 1, wherein the second mode is performed solely by the second electric capacitor.

10. The electric storage device according to claim 1, wherein
the electric storage device comprises:
a detection unit that is configured to detect a charging rate of the second electric capacitor; and
a charging/discharging circuit that constitutes a current path between the first electric capacitor and the second electric capacitor, wherein,
based on relationship between the charging rate of the second electric capacitor and a deterioration factor of the second electric capacitor, if an estimated deterioration factor, which is the deterioration factor corresponding to a value obtained by adding or subtracting a predetermined value to or from the charging rate of the second electric capacitor obtained before the second mode is performed, is equal to or larger than a threshold, the processor controls the charging/discharging circuit so as to perform charging and discharging between the first electric capacitor, the estimated deterioration factor of which falls below the threshold, and the second electric capacitor.

11. The electric storage device according to claim 10, wherein, if the estimated deterioration factor is equal to or larger than the threshold, the processor controls the charging/discharging circuit so as to perform discharging from the second electric capacitor to the first electric capacitor.

12. The electric storage device according to claim 10, wherein the predetermined value is set based on the amount of shift in the charging rate of the second electric capacitor observed when the second electric capacitor performs the charging and discharging for stabilizing frequencies in the external power system.

13. The electric storage device according to claim 1, wherein the processor controls the converter so as to perform the first mode with a higher priority than the second mode.

14. The electric storage device according to claim 13, wherein
the electric storage device comprises a reception unit that is configured to receive a command sent from a server apparatus that manages charging and discharging between the electric storage device and the external power system, wherein,
if the reception unit receives both a command to execute the first mode and a command to execute the second mode at the same time, the processor controls the converter so as to perform the first mode with a higher priority than the second mode.

15. Equipment having the electric storage device according to claim 1.

16. A control method for an electric storage device including a first electric capacitor, a second electric capacitor, and a converter to convert electric power transmitted between an external power system external to the electric storage device and at least one of the first electric capacitor and second electric capacitor, the control method comprising:
controlling the converter to operate in at least one of a first mode and a second mode, the first electric capacitor continuously discharging electric power to the external power system in the first mode, the second electric capacitor discharging electric power to the external power system and being charged by the external power system, intermittently, to stabilize frequencies in the external power system in the second mode.

17. A control method for an electric storage device including a first electric capacitor, a second electric capacitor, and a converter to convert electric power transmitted between an external power system external to the electric storage device and at least one of the first electric capacitor and second electric capacitor, the control method comprising:
controlling the converter to operate in at least one of a first mode and a second mode, the first electric capacitor continuously discharging electric power to the external power system in the first mode in a way of being suitable for characteristics of the first electric capacitor, the second electric capacitor discharging electric power to the external power system and being charged by the external power system, intermittently, in a way of being suitable for characteristics of the second electric capacitor.

* * * * *